Sept. 3, 1935.　　　　J. ROBINSON　　　　2,013,479
APPARATUS FOR SMOKING OR CURING FOODSTUFFS
Filed May 4, 1933　　　6 Sheets-Sheet 1
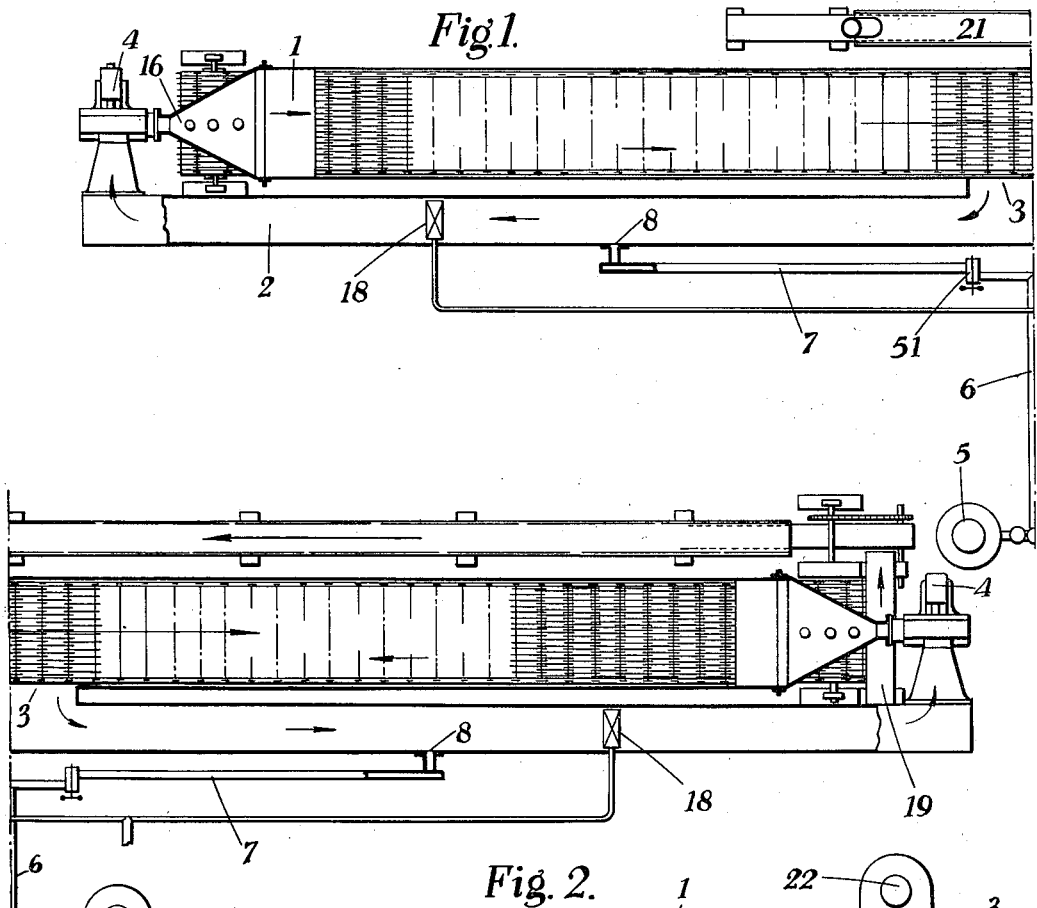
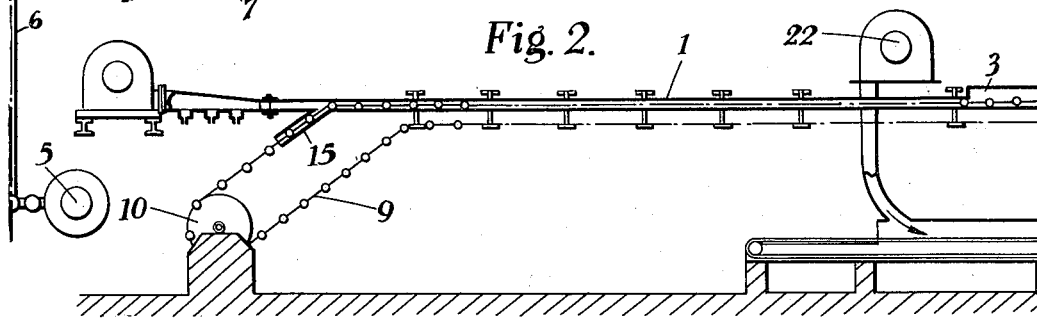
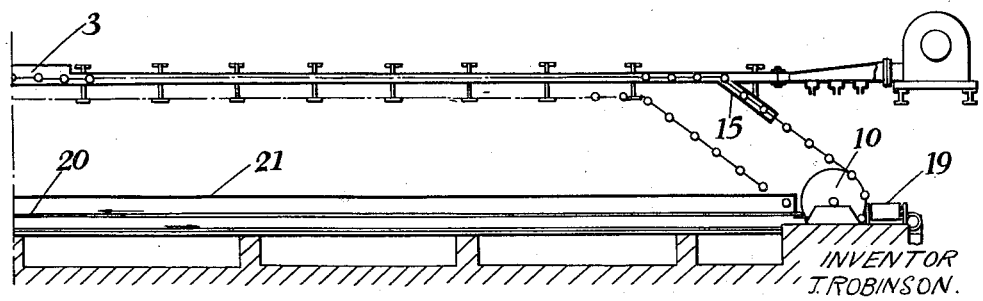
INVENTOR
J. ROBINSON.
BY Barker and Collings
ATTORNEYS

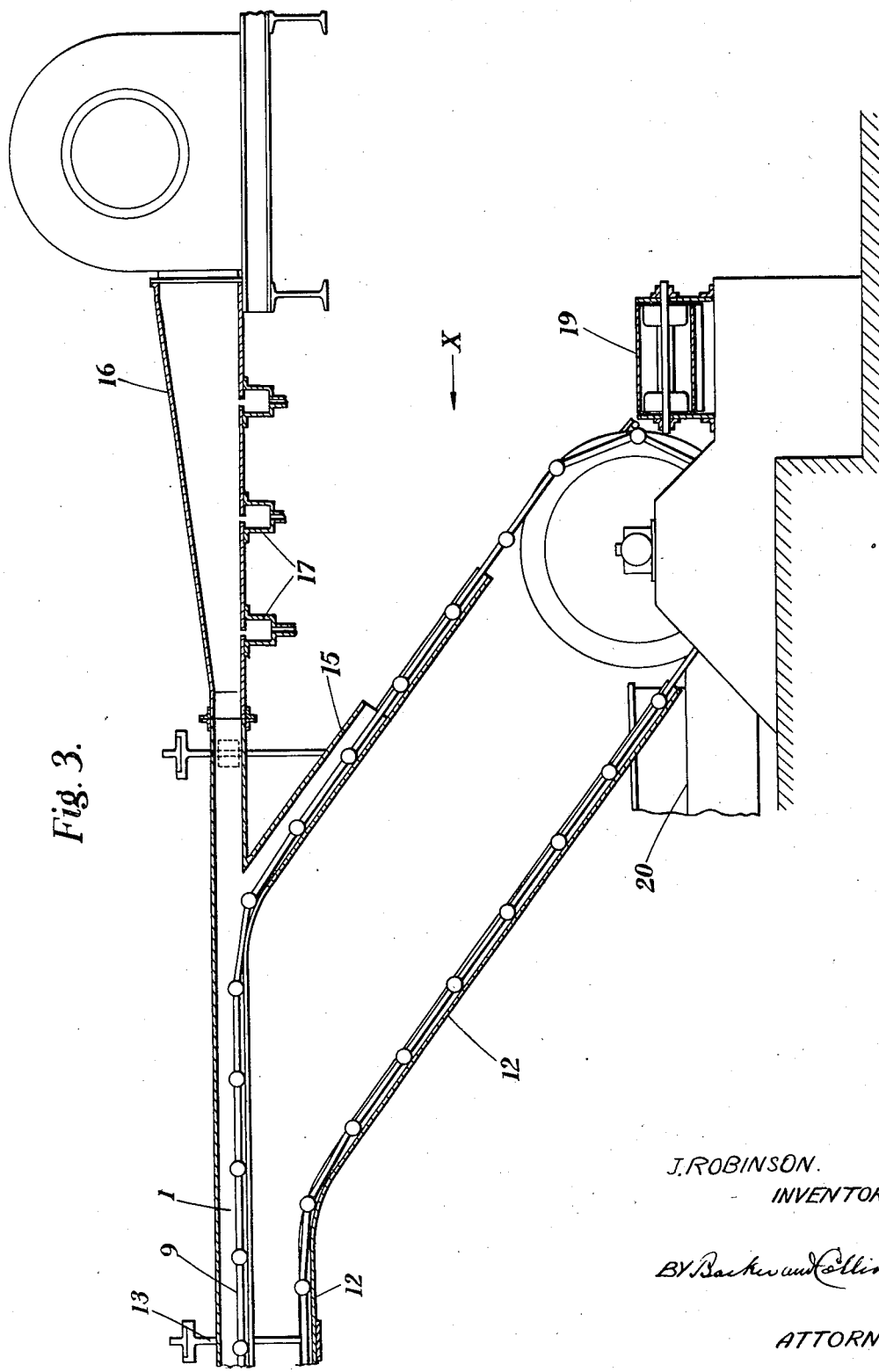

Sept. 3, 1935.   J. ROBINSON   2,013,479
APPARATUS FOR SMOKING OR CURING FOODSTUFFS
Filed May 4, 1933   6 Sheets-Sheet 3

J. ROBINSON
INVENTOR

BY Barker and Collings
ATTORNEYS

Sept. 3, 1935. J. ROBINSON 2,013,479
APPARATUS FOR SMOKING OR CURING FOODSTUFFS
Filed May 4, 1933 6 Sheets-Sheet 5

Sept. 3, 1935.  J. ROBINSON  2,013,479
APPARATUS FOR SMOKING OR CURING FOODSTUFFS
Filed May 4, 1933  6 Sheets-Sheet 6

J. ROBINSON.
INVENTOR

BY Barker and Collings
ATTORNEYS.

Patented Sept. 3, 1935

2,013,479

UNITED STATES PATENT OFFICE 2,013,479

APPARATUS FOR SMOKING OR CURING FOODSTUFFS

James Robinson, West Bridgford, Nottingham, England

Application May 4, 1933, Serial No. 669,412
In Great Britain May 7, 1932

4 Claims. (Cl. 99—2)

This invention is concerned with apparatus for smoking or curing fish or other food stuffs and has for an object to provide apparatus in which such a process may be carried out expeditiously, efficiently, and with the expenditure of the minimum amount of manual labour. Therefore this invention provides apparatus for smoking or curing fish or other foodstuffs comprising in combination a smoking chamber, smoke producing means for supplying smoke thereto, and means for conveying foodstuffs to be smoked progressively through said chamber.

An embodiment of the invention incorporating these and other features in combination is hereinafter described with reference to the accompanying drawings in which:—

Figure 1 is a part-sectional plan of apparatus in accordance with the present invention.

Figure 2 is a part-sectional elevation of the same apparatus, the section being taken on two planes for clearness.

Figure 3 is an enlarged sectional elevation of that end of the apparatus at which the fish or the like is delivered from the smoke chamber.

Figure 4:
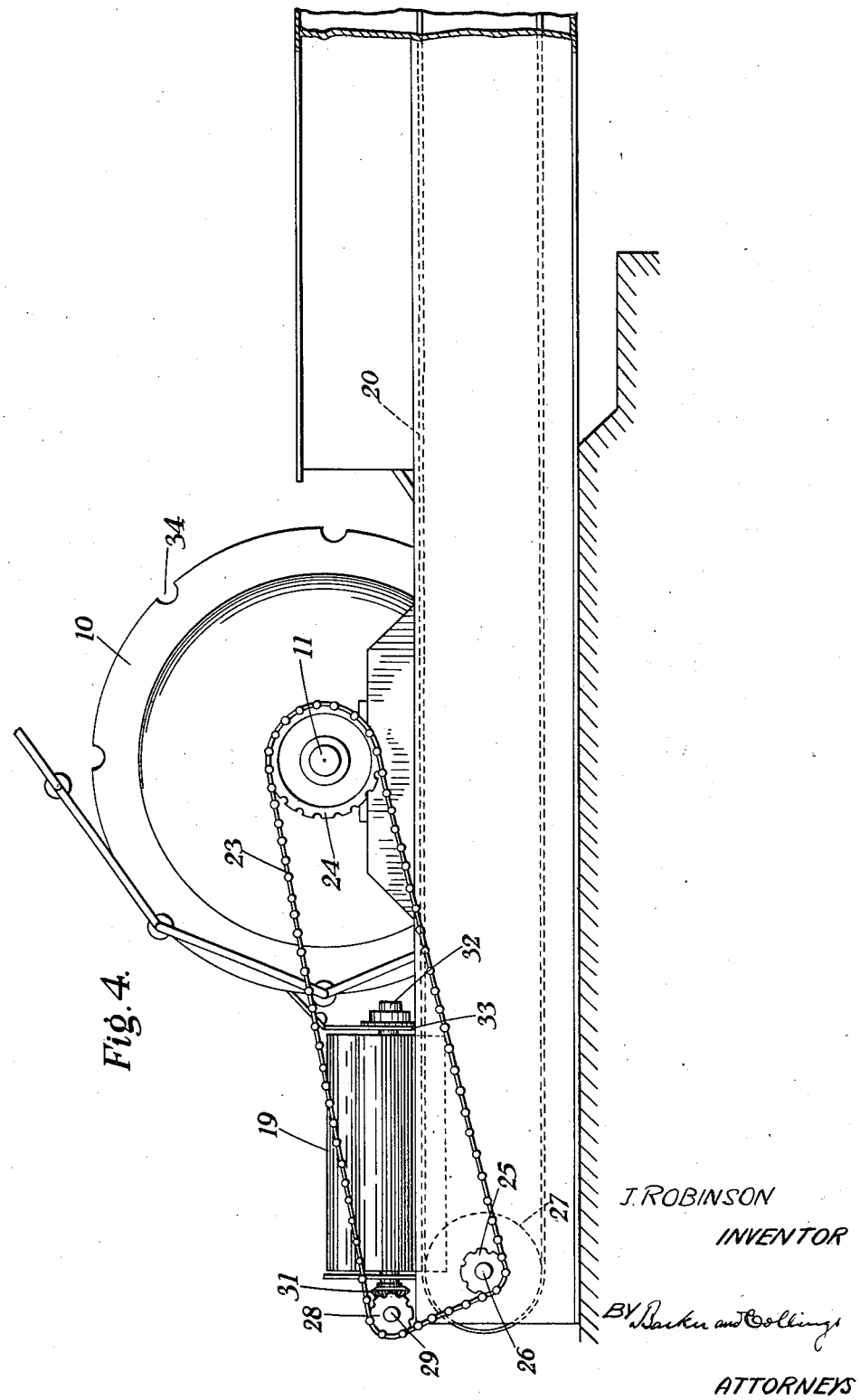
Figure 4 shows a rear view, further enlarged, of the lower part of the apparatus shown in Figure 3.

In one method of carrying out the invention the apparatus comprises an elongated chamber or compartment 1 within which the fish or other foodstuff is smoked or cured, said chamber being preferably of considerable length (for example from 60 to 100 feet). Extending alongside the smoking chamber 1 and conveniently along the whole of its length is a second chamber or compartment 2 which constitutes a smoke reservoir, said reservoir 2 advantageously communicating with the smoking chamber 1, substantially centrally in its length, by a passage or passages 3. The two ends of said smoke reservoir 2 are closed and communicate with a high velocity motor or other driven fan 4. Each fan 4 also communicates with the adjacent end of the smoking chamber 1 and functions to draw smoke from the reservoir 2 and blow same mixed with a suitable quantity of air into the two ends of the smoking chamber 1. The smoke reservoir 2 also communicates with one or more smoke producers 5 advantageously by means of a pipe 6 which branches into two other pipes 7, which latter communicate with the smoke reservoir 2 by openings 8 located a suitable distance one at each side of the aforesaid central passage 3 between chambers 1 and 2. The arrangement is such that smoke from the producer or producers 5 entering the reservoir 2 is drawn to each end of said reservoir by the two fans 4 which force said smoke into the two ends of the smoking chamber 1, said fans operating to circulate the smoke from the reservoir 2 into each end of the smoking chamber 1 and back again into the reservoir through the central passage 3.

During the circulation of smoke as above-described the fish or the like is continuously and progressively traversed along and through the smoking chamber 1. This is conveniently accomplished by providing an endless conveyor 9 which passes over suitably-designed wheels or drums 10 at each end of the apparatus, one of said wheels or drums being mounted on a drive shaft 11 which is directly or indirectly driven from a motor or other power source. The upper part of the conveyor 9 travels through the smoking chamber 1, while the lower half or part of said conveyor extends beneath said conveyor and runs upon a plate or other support 12 which is carried by a series of hanging brackets or pedestals 13 or other convenient means. The brackets 13 are also advantageously provided with lateral branch portions 14 which constitute supports for the smoking or curing chamber 1. Conveniently the conveyor 9 is led into and out of the smoking chamber 1 through downwardly-inclined branch portions 15, the chamber 1 being extended beyond said branch portions 15 to the two fans 4. These extensions 16 at each end of the chamber 1 may be formed as separately connected portions and advantageously converge in plan from the fan to the chamber, as shown in Figure 1. The base of each end extension 16 of the chamber 1 may be provided with a plurality of traps 17 into which are deposited the tarry products generated in the making of the smoke and extracted by the centrifugal speed of the fans, said products being deposited before reaching the fish or the like in the smoking chamber.

The mixture of smoke and air circulated through the smoking chamber 1 is advantageously heated before entering the intake of the fans 4 by hot water, steam or equivalent heating devices in the reservoir 2. Conveniently the heating is effected by passing the smoke mixture through two steam heaters indicated at 18 in Figure 1, the temperature being automatically controlled by thermostatic valves. It will be appreciated that the smoke introduced at each end of the smoking chamber and withdrawn at the centre produces a comparatively dense smoke zone about the centre part of the chamber and it will also be appreciated that by suitably controlling the amount of smoke introduced the density thereof can be regulated as required.

The fish or the like deposited upon the conveyor chain 9 is traversed through the smoking chamber 1 at a predetermined speed, which speed may be adjusted as required, and after leaving the smoking chamber 1, said fish is delivered on to a comparatively short endless travelling belt 19 extending transversely of the apparatus. From this short transverse belt the fish is deposited upon a further endless conveyor 20 preferably extending alongside or parallel with the smoking chamber 1 but on a lower level. This conveyor 20 travels through a cooling chamber 21 into which is introduced a current of air from a suitable fan 22 (Figure 2), the air being introduced at the end of the chamber 21 opposite to that at which the fish enter so that the fish are caused to travel against the air current. From the cooling chamber 21 the fish or the like are delivered, cured, smoked, cooled and ready for packing.

Any suitable means are employed for imparting the requisite drive to the small cross belt 19 and to the conveyor 20 within the cooling chamber 21. For example an endless chain 23 passing over a chain wheel 24 on the main drive shaft 11 also passes over a chain wheel 25 on the shaft 26 appertaining to one of the rollers or the like 27 over which the endless conveyor 20 passes (see Figures 4 and 5). The driving chain 23 may also pass over a further chain wheel 28 on a spindle 29 carrying a bevel wheel 30 which meshes with a further bevel wheel 31 mounted on a shaft 32 carrying one of the end rollers or the like 33 over which passes the short cross belt 19. Thus it will be seen that drive is transmitted from the main shaft 11 to the main fish conveyor 9, the cross belt 19 and cooler belt 20, and by determining the diameters of the various chain wheels, the relative speed of traverse of the several belts or conveyors can also be variably determined to suit existing requirements, such speed being to a certain extent governed by the type of fish or the like to be cured and the climatic conditions.

Figure 5:
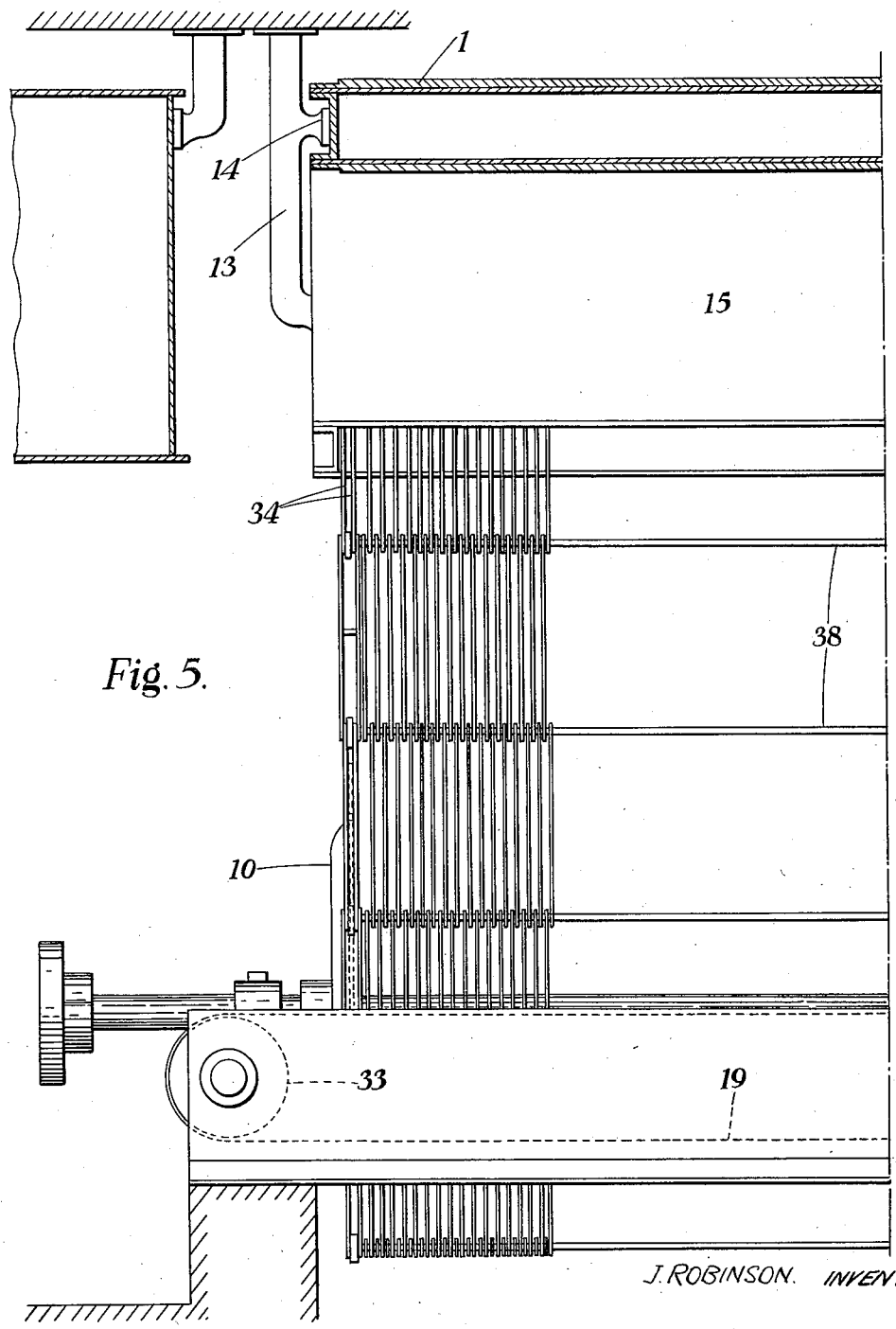
Figure 5 is an end elevation of the apparatus also enlarged looking in the direction indicated by arrow X in Figure 3, the upper part of the apparatus being shown in section.
Figure 6:
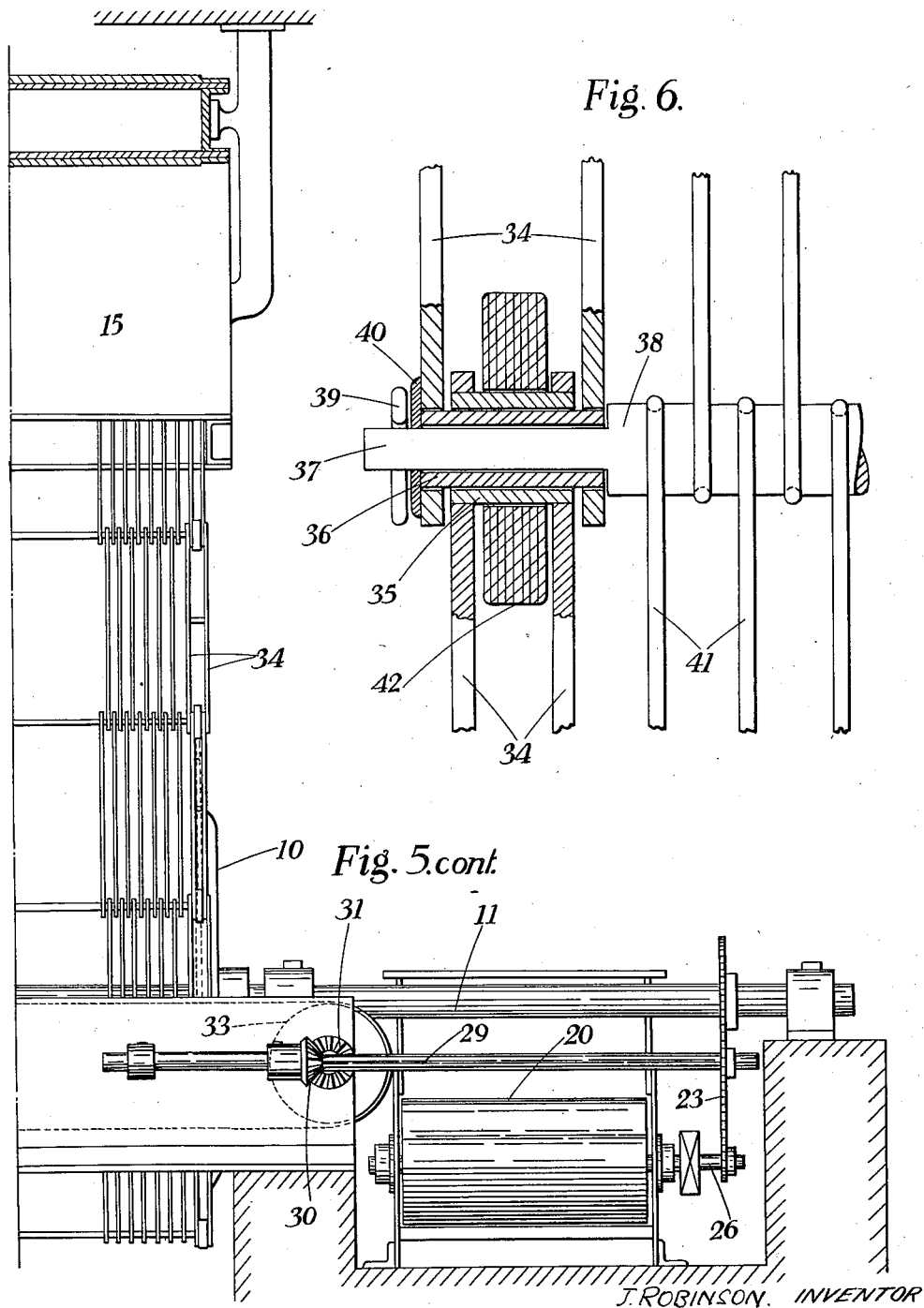
Figure 6 is a part-sectional detail, still further enlarged, showing a method of constructing the main conveyor.

The main conveyor 9 is advantageously of a mesh chain type, and a convenient construction of chain is shown more clearly in Figures 5 and 6. Each side of the conveyor may be composed of a series of flat-sectioned links 34 arranged in pairs, alternate pairs of said links 34 being disposed closer together than those of the remaining alternate pairs so that the ends of the closer disposed links are accommodated between the ends of the remaining links. These links 34 are mounted upon sleeves or collars 35, 36, one of said sleeves loosely encircling the other and on both sleeves loosely encircling a reduced portion 37, formed at each end of each of a series of cross pins 38 constituting hinge pins of the conveyor. The link sleeves 35, 36 are maintained upon the reduced ends 37 of the hinge pins 38 by split or other pins 39 or their equivalent and a washer 40. The body portion of the conveyor is composed of parallelly-disposed wires 41 which are curled round the pins 38 at their extremities, the wires 41 appertaining to any one hinged section of the conveyor extending out of alignment with the wire appertaining to the adjoining hinged section. At each end of each of the hinge pins 38 of the conveyor and loosely encircling the sleeve 35 is a roller 42, which rollers run upon the base of the smoking chamber 1 and also on the supporting member 12 beneath same during the traverse of the conveyor. Advantageously the conveyor rollers 42 coact with part-circular recesses 43 in the wheels or drums 10 on the drive shaft 11 so as to transmit the requisite drive to the conveyor.

Figure 7:
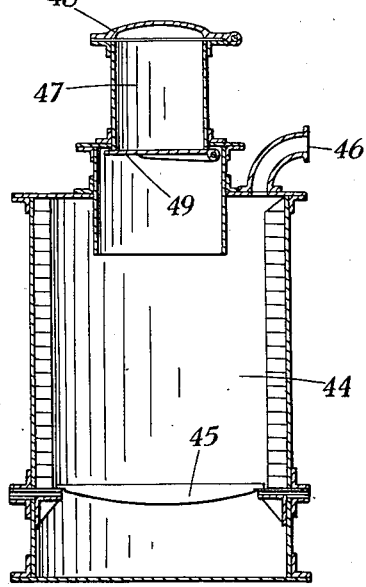
Figure 7 shows in vertical section a suitable smoke-producer for use with the apparatus.
Figure 8:
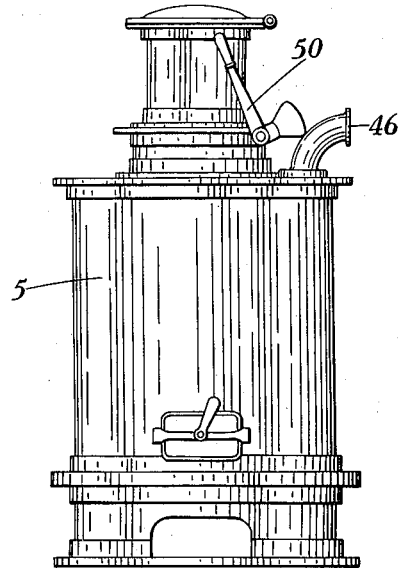
Figure 8 is an external view of the smoke producer.

Conveniently the smoke for circulation through the chamber 1 and reservoir 2 is produced in and delivered from two producers indicated at 5 (Figure 1). Any suitable form of producer may be employed and one convenient construction is illustrated in Figures 7 and 8. This producer comprises a vertically-disposed cylindrical chamber 44, firebrick lined, with fire bars 45 near its base and a smoke outlet 46 which communicates with the aforesaid pipe 6, a fuel hopper 47 at the upper part of the furnace closed by hinged door 48, the wood waste or other fuel introduced into said hopper being admitted to the furnace by way of a hinged door 49 which is opened and closed by manipulation of an external hand-lever 50 which is preferably counter-weighted normally to maintain the door closed.

Figure 9:
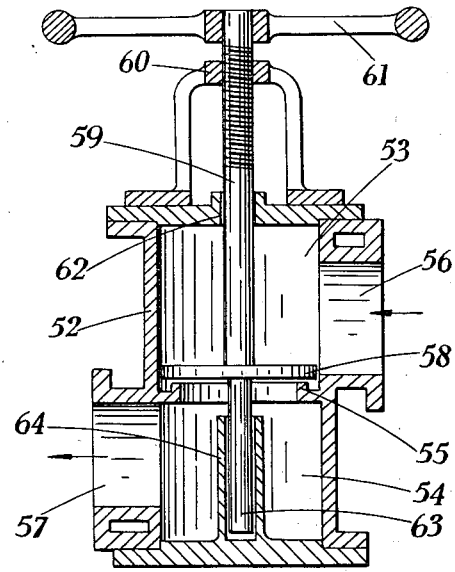
Figure 9 shows in section a suitable smoke-regulating valve.

The introduction of smoke to the reservoir 2 is governed by a pair of smoke valves 51, and one convenient construction of valve is shown in Figure 9. Such valve comprises a casing 52 having two chambers 53, 54 and valve seating 55 between same, the smoke entering at the part 56 and issuing at 57. Coacting with the valve seating 55 is a valve 58 carried by stem 59 and screwing into an internally-threaded boss or sleeve 60 at the upper part of the valve, the axial displacement of the valve for opening and closing the passage between the two chambers 53, 54 being effected by turning the wheel 61. The valve spindle is maintained steady in its motion by passing same through a plate or like portion 62 and by providing a valve stem extension 63 fitting into an upstanding socket 64.

Prior to introducing the fish or the like into the smoking chamber 1 same is immersed in brine, and this may be accomplished by placing the fish or the like on a conveyor which travels through a brine container at a regulated speed so as to ensure that the fish is immersed in the brine for the required period.

It is to be understood that the particular construction of the apparatus in accordance with the present invention may be varied in many ways within the scope of the invention. For example, instead of blowing the smoke into the smoking chamber at the extreme ends thereof as before-described, same may be introduced into the upper part or cover of the chamber at or near its ends so as to cause the smoke to travel diagonally downwards through the chamber to a central opening in the base of the chamber. The construction of the fish conveyor may also be varied to suit existing requirements. For example racks, trays or the like connected to travelling bands or chains may be so constructed and arranged as to support the fish or the like at a suitable angle to the flow of the smoke, it being understood that said racks or trays are constructed to permit free access of smoke to both the upper and underside of the fish during the traverse thereof.

It will be appreciated that the operation of apparatus as previously described can be continued for lengthy periods without necessitating any interruption of the process for the purpose of replenishing the smoking chamber.

I claim:—

1. Apparatus for smoking foodstuffs comprising an elongated smoke-chamber, a travelling conveyor which enters said chamber at one end and reappears at the other for carrying the foodstuffs progressively through said chamber from end to end thereof, a smoke conduit extending externally of the chamber and communicating therewith at each end thereof and at an intermediate point, a smoke producer for supplying smoke to the chamber and conduit, and means for circulating smoke through the chamber by way of the intermediate opening and the opposed ends of the chamber.

2. Apparatus for treating fish or other foodstuffs with smoke, comprising a lengthy smoke-chamber of flattened form to closely embrace a travelling belt-like conveyor, a downwardly inclined branch adjacent to each end of said chamber, a travelling belt-like conveyor for transporting the foodstuffs through the smoke chamber one lap of which conveyor passes up one such branch into the chamber, along the latter and out at the other branch, guides for guiding the lap in its passage as specified, a fan at each end of said chamber, means for driving the two fans, a smoke conduit extending exteriorly of the chamber from fan to fan whereby a closed path is formed through the two fans, the smoke chamber, and said conduit, which said conduit also communicates with the smoke chamber at a medial point in the length thereof, means for supplying smoke to said conduit, and means for driving the fans to force smoke towards the said medial point.

3. Apparatus for treating fish and other foodstuffs with smoke, comprising an elongated smoke chamber shaped to embrace closely a conveyor travelling therethrough, a downwardly inclined branch, adjacent to each end of said chamber, a travelling belt-like conveyor for transporting the foodstuffs through the chamber, which conveyor passes up one such branch into the chamber, guides for guiding the conveyor, a fan at each end of the chamber, a smoke conduit extending exteriorly of the chamber from fan to fan, which conduit communicates with the chamber at the ends and at an intermediate point also, means for supplying smoke, and means for driving the fans to circulate the smoke through the chamber, conduit, and the intermediate point of communication.

4. Apparatus for smoking foodstuffs comprising an elongated smoke chamber, an endless conveyor traversing said chamber and closely embraced thereby, a smoke conduit extending externally of the chamber and communicating therewith at each end thereof and at an intermediate point, a smoke producer for supplying smoke to the chamber conduit, and means for circulating smoke through the chamber by way of the intermediate opening and the opposed ends of the chamber.

JAMES ROBINSON.